United States Patent [19]
Bernhard

[11] 3,948,009
[45] Apr. 6, 1976

[54] SOUND INSULATING WALL MADE FROM COMPOSITE RUBBER MATERIAL

[75] Inventor: Klaus Bernhard, Wermelskirchen, Germany

[73] Assignee: Bayer Aktiengesellschaft, Leverkusen, Germany

[22] Filed: Mar. 11, 1974

[21] Appl. No.: 449,803

[30] Foreign Application Priority Data
Apr. 28, 1973 Germany............................ 2321676

[52] U.S. Cl............................... 52/144; 181/33 G
[51] Int. Cl.²............................................. E04H 1/82
[58] Field of Search........ 404/32; 181/33 G, 33 HE; 161/190, 162, 159; 260/2.3, 2.5 AK, 2.5 BE; 52/144

[56] References Cited
UNITED STATES PATENTS

| | | | |
|---|---|---|---|
| 2,323,936 | 7/1943 | Roberts | 181/33 GA |
| 3,256,218 | 6/1966 | Knox | 260/2.5 AK |
| 3,272,098 | 9/1966 | Buchholz | 161/162 |
| 3,697,366 | 10/1972 | Harlock | 181/33 G |
| 3,801,421 | 4/1974 | Allen | 404/32 |

FOREIGN PATENTS OR APPLICATIONS

| | | | |
|---|---|---|---|
| 410,563 | 5/1934 | United Kingdom | 404/32 |
| 338,247 | 11/1930 | United Kingdom | 404/32 |
| 366,559 | 2/1932 | United Kingdom | 404/32 |

*Primary Examiner*—John E. Murtagh
*Attorney, Agent, or Firm*—Joseph C. Gil; Gene Harsh

[57] ABSTRACT

A sound insulation wall having good sound reflection and/or sound absorption properties, high resistance to weathering, resistance to stress, can be easily assembled and has a relatively low weight per unit area can be made in boards 5 to 20 cm in thickness from composite rubber materials comprising rubber shavings having a volume of which is mostly 1 to 20 cm³ incorporated with a binder of reactive resin.

5 Claims, 6 Drawing Figures

SOUND INSULATING WALL MADE FROM COMPOSITE RUBBER MATERIAL

BACKGROUND OF THE INVENTION

This invention relates to a sound-insulating wall made of composite rubber materials which can be erected in the open air along traffic routes, airports, building sites and sound intensive manufacturing sites to reduce the noise level.

Sound-insulating walls are to an increasing extent being built to protect the environment and are mainly intended to prevent excessive noise in residential areas.

The effect of these insulating walls is based either on reflection or on absorption of the sound waves impinging on them. Either one or other effect predominates according to the construction of the walls, for example, if a wall has a closed surface and a weight per unit area of more than about 10 kp/m² then the sound waves are almost completely reflected. Stone or concrete walls, for example, may be regarded as pure reflection walls.

Very recently, insulating walls have been developed, the action of which is based mainly on the absorption of the sound waves. This absorption is generally effected by the friction of oscillating air particles against the skeleton of unicellular materials, which causes the conversion of sound into heat energy. Suitable absorption materials are, for example, fibrous materials such as glass or stone wool and open-celled soft foams.

A sound-absorption wall of this kind may comprise for example, three regions: A first region comprises absorption material for absorbing the high frequency sound waves. A second region comprises a cavity which is formed by boards of a plastics material and by means of which the low-frequency sound waves are partly destroyed. A third region offers protection against mechanical damage which could be caused by factors such as falling gravel or hailstones. It must be perforated to enable the sound waves to penetrate the wall. This may be achieved, for example, by using perforated plastics boards like those used for facings.

The disadvantages of known reflection walls which have previously been built mainly of stone and steel concrete are that, due to the high weight per unit area of the walls, the costs of erecting them are high compared with those of lighter weight constructions and that transport, assembly and dismantling of the walls require more effort and expenditure and, for large walls, the wall elements cannot be prefabricated.

The sound-absorption walls which have so far been developed also have disadvantages: The destruction of low-frequency sound waves in the cavity is incomplete, the measures for providing the cavity are very difficult and expensive and the effect of the cavity is seriously impaired in the event of any leakage so that even minor damage substantially impairs the efficiency of the wall.

It is an object of this invention to provide a soundinsulating wall which, in addition to having good sound reflection and/or sound absorption properties, also has high resistance to weathering and resistance to stress, can easily be assembled from individual parts and has a relatively low weight per unit area.

According to the invention, this problem is solved by a sound-insulating wall which is characterized in that boards 5 to 20 cm in thickness made of composite rubber materials are secured as filling elements to a stable frame or a weight-bearing construction, the said composite rubber materials comprising rubber waste, i.e. rubber shavings, in particular old tire shavings, which preferably mostly have a volume of 1 to 20 cm³, which shavings constitute the aggregate, and reactive resins which serve as binders.

The rubber shavings are obtained, for example, by grinding old motorcar tires. The steel and textile reinforcements in the tires are ground at the same time and are preferably left in the shavings. The sound-insulating wall according to the invention has the advantage that the boards of which it is constructed are highly weather-resistant, consist for the major part of waste materials, are simple to manufacture and can easily be secured to a weight-bearing construction.

The space between the rubber shavings is preferably filled with binders which are cellular but have a predominantly closed cell structure. This embodiment is suitable for reflection walls. The weight per unit area of the boards is preferably between 22.5 and 170 kp/m², depending on their thickness, which is preferably between 5 and 20 cm, and their density which is preferably from 450 to 850 kp/m³. This weight per unit area is sufficient to obtain good sound reflection.

According to another embodiment of the sound-insulating wall according to the invention, the space between the rubber shavings is only partly filled with binder. Boards of this type have a higher absorption capacity. The side of the boards facing away from the sound emission source is, in this case, preferably provided with a close-textured covering. This has the purpose of reflecting any sound waves which do penetrate the boards. The sound waves thrown back in this way are then absorbed inside the boards.

In another embodiment of the sound-insulating wall according to the invention, the boards whose cavities between the rubber shavings are only partly filled with binder contain in addition open-celled soft foam waste particles between the rubber shavings. This soft foam enhances the sound-absorption effect.

The side of the sound-insulating wall facing the source of the sound is preferably provided with a sound-absorption layer which gives the wall the character of an absorption wall. The sound waves passing through the absorption layer are absorbed or reflected in the boards.

The reflected sound waves are then completely absorbed in the absorption layer. If a stone wool or soft foam mat is used as the absorption layer, it should preferably have a thickness of from 1 to 4 cm. The absorption layer may be covered e.g. with a polyethylene foil to protect it against moisture or dust. The absorption layer may also be protected against mechanical stress, for example by placing, in front of the absorption layer, a synthetic fiber fleece of up to 2 cm, preferably 1 cm, in thickness which does not reflect sound waves.

According to one embodiment of the sound-insulating wall according to the invention which has proved to be particularly advantageous, the sound-absorption layer is situated at some distance in front of the boards. The air gap thereby formed between the sound-absorption layer and the boards enhances the overall effect of the sound-insulating wall. In this embodiment, the mats or fleeces can be manufactured in large sizes, e.g. in the form of webs. They are easier to manufacture and assemble in this way and can extend across a structural member. The sound-absorption layer is fixed to a structure member or weight-bearing sections. If necessary, it is backed with a coarse-meshed wire fence to obtain greater strength if the layer has to span long distances. If the sound-absorption layer is damaged by accident or during normal wear and tear, it can easily be replaced.

If the boards are designed to span considerable distances, they must for reasons of strength be thicker. The surfaces of the boards or their coverings and sound-absorption layers may, of course, be decorated with paint.

Moisture hardening isocyanates constitute suitable binders.

To prepare these binders, the isocyanate is reacted with water, the reaction resulting in cross-linking of urea groups and evolution of carbon dioxide. A binder with an elastomeric character is obtained in this way. The carbon dioxide evolved in the reaction acts as blowing agent so that, in the hardened state, the binder has a predominantly cellular structure. The evolution of carbon dioxide and hence the cellular structure of the binder can be increased by moistening the rubber shavings with water. Two-component polyurethane systems may also be used as binders. The cross-linking of the two components is effected by reacting the isocyanate with alcohol which results in the formation of polyurethane.

Isocyanates that can be used would include for example: 2,4-tolylene diisocyanate, 65/35-tolylene diisocyanate, 80/20-tolylene diisocyanate, 4,4'-diphenylmethane diisocyanate, dianisidine diisocyanate, tolidine diisocyanate, hexamethylene diisocyanate, m-xylylene diisocyanate, phenyl isocyanate, p-chlorophenyl isocyanate, o-chlorophenyl isocyanate, m-chlorophenyl isocyanate, 3,4-dichlorophenyl isocyanate, 2,5-dichlorophenyl isocyanate, methyl isocyanate, ethyl isocyanate, n-butyl isocyanate, n-propyl isocyanate, and octadecyl isocyanate.

Any suitable organic polyisocyanate may be used. Suitable polyisocyanates include aliphatic, cycloaliphatic, araliphatic, aromatic or heterocyclic polyisocyanates such as those described e.g. by W. Siefken in justus Liebigs Annalen der Chemie, 562, pages 75 to 136, for example ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3- and 1,4-diisocyanate and any mixtures of these isomers; 1-isocyanato-3,3,5-trimethyl-5-isocyanato-methyl-cyclohexane (German Auslegeschrift No. 1,202,785), hexahydrotolylene-2,4- and 2,6-diisocyanate and any mixtures of these isomers; hexahydrophenylene-1,3 and/or 1,4-diisocyanate, perhydrodiphenylmethane-2,4' and/or 4,4'-diisocyanate, phenylene-1,3- and 1,4-diisocyanate, tolylene-2,4 and 2,6-diisocyanate and any mixtures of these isomers; diphenylmethane-2,4'- and/or 4,4'-diisocyanate, naphthylene-1,5diisocyanate, triphenylmethane 4,4',4''-triisocyanate, polyphenylpolymethylene-polyisocyanates which may be obtained by anilineformaldehyde condensation followed by phosgenation and which have been described e.g. in British Patent Specification No. 874,430 and 848,671, perchlorinated aryl polyisocyanates such as those described e.g. in German Auslegeschrift No. 1,157,601, polyisocyanates which contain carbodiimide groups as described in German Pat. No. 1,092,007, the diisocyanates described in U.S. Pat. No. 3,492,330, polyisocyanates which contain allophanate groups as described e.g. in British patent Specification No. 994,890, Belgian Pat. No. 761,626 and published Dutch Pat. application No. 7,102,524, polyisocyanates which contain isocyanaurate groups as described e.g. in German Pat. Nos. 1,022,789, 1,222,067 and 1,027,394 and in German Offenlegungsschriften No. 1,929,034 and 2,004,048, polyisocyanates which contain urethane groups as described e.g. in Belgian pat. No. 752,261 or in U.S. Pat. No. 3,394,164, polyisocyanates which contain acylated urea groups in accordance with German Pat. No. 1,230,778, polyisocyanates which contain biuret groups as described e.g. in German Pat. No. 1,101,394, in British Pat. Specification No. 889,050 and in French Pat. No. 7,017,514, polyisocyanates prepared by telomerization reactions as described e.g. in Belgian Pat. No. 723,640, polyisocyanates which contain ester groups as described e.g. in British pat. Specification Nos. 965,474 and 1,072,956, in U.S. Pat. No. 3,567,763 and in German Pat. No. 1,231,688 and reaction products of the above mentioned isocyanates with acetals in accordance with German Pat. No. 1,072,385.

The binder content is preferably between 5 and 15 percent based on the dry weight of the rubber shavings. This quantity of binder ensures efficient bonding of the shavings. If this quantity of binder foams up, the cavity is partly or completely filled with a binder which has a predominantly closed celled structure. The density of the composite rubber material is between 450 and 850 $kp/m^3$, depending on the degree of compression. The material is resistant to weathering and frostproof.

The sound-insulating wall according to the invention has the advantage over reflection walls made of steel concrete that it is considerably lighter in weight. This advantage is particularly important in the case of walls which are only used temporarily on building sites etc, because it makes it possible for them to be more easily assembled and dismantled. A special advantage of these reflection walls, is that, when they are erected along motorways and traffic routes, the weight-bearing construction can be fitted with weak points along which it is more liable to break in the event of impact so as to reduce the risk of damage to any vehicles crashing into these walls. The elastic character of the sound-insulating wall, which is due to the elastomeric binder and the rubber shavings, provides the walls with an advantage over steel concrete walls in the event of vehicles crashing into the wall, in that the boards of the sound-insulating wall according to the invention are able to a certain extent, to yield.

Compared with known sound-absorption walls, the sound-absorption walls according to the invention are particularly distinguished by their simpler construction, reduced liability to damage and greater efficiency. In addition, sound-insulating walls of this kind are less expensive to produce and contribute to the solution of environmental problems by using waste materials.

The structural member weight bearing construction may have various forms. Sufficient examples are already known for building walls with filling elements, for example, it is known to use vertical double T-shaped sections which are anchored to the ground and in which the ends of the boards are pushed between the flanges of the double T-shaped sections. The edges of the boards may, of course, themselves be profiled so that, for example, a tongue-and-groove joint may be formed between the ends of the boards and the double T-shaped sections so that smooth surfaces are obtained. Furthermore, the edges of the boards may be profiled so that, when several boards are placed one upon the other, they engage with each other by their corresponding profiles and thereby increase the strength of the wall as a whole. Reinforcing elements may, of course, be inserted between the individual boards to extend from one vertical section to the next, and these reinforcing elements may, if necessary, by fixed to the vertical sections. On the other hand, the boards may also be fixed to transverse sections, for example by means of plug and socket or screw connections. The boards may, of course, contain mechanical reinforcements such as wire inserts.

The process for admixing the rubber shavings and the binder can be accomplished by stirring, whipping or any standard process familiar to one skilled in the art.

Three examples of the sound-insulating wall according to the invention have been shown diagrammatically in the accompanying drawing and are described in more detail below.

BRIEF DESCRIPTION OF THE DRAWINGS

In the accompanying drawings,

FIG. 1 — showing a top plan view,
FIG. 2 — a side view,
FIG. 3 — a section on the line AB in FIG. 2,
FIG. 4 — a section on the line CD in FIG. 1,
FIG. 5 — shows a top plan view of a second embodiment

DETAILED DESCRIPTION OF THE DRAWINGS

Figure 1:
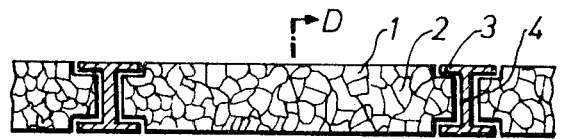
FIGS. 1 to 4 represent a first embodiment of the sound-insulating wall.
Figure 2:
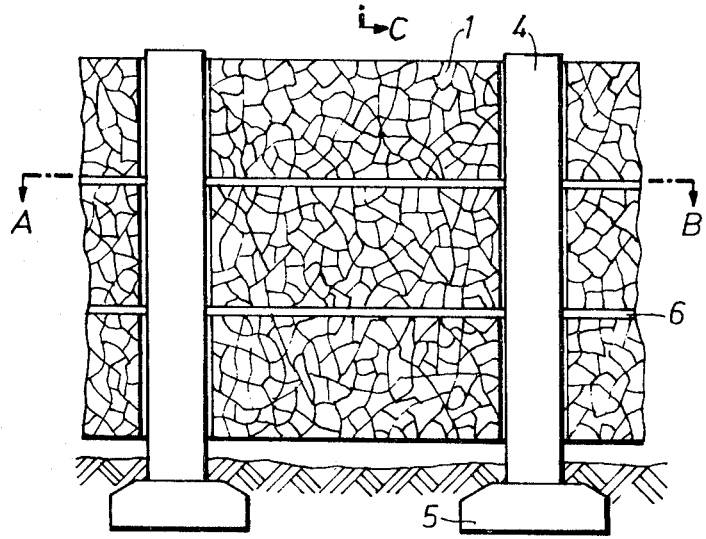
Figure 4:
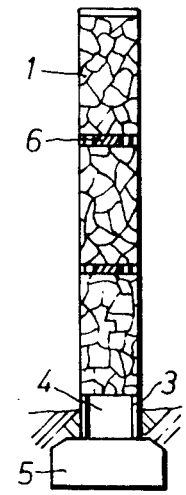
Figure 3:
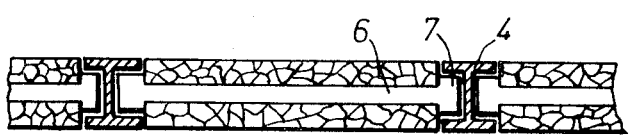

In FIGS. 1 to 4, the sound-insulating wall comprises boards 1, the ends of which are formed as tongues 2 and engage between the flanges 3 of the double T-sections 4. The double T-sections 4 are anchored to the ground by means of concrete blocks 5. Flat steel reinforcements 6 extending in the longitudinal direction are inserted between the boards 1. These reinforcements are thickened at their ends 7 so that they fit into the recess formed between the flanges 3 of the vertical double T-sections 4. The double T-sections 4 are made of steel. The boards 1 have a thickness of 10 cm. Their composite rubber material is composed of waste rubber shavings which have a volume in the region of 1 to 20 cm$^3$.

The shavings are bonded by means of an isocyanate which is hardened with water. The rubber shavings themselves still contain the steel and textile reinforcements which are contained in the old tires. The binder content is between 5 and 15 percent, based on the dry weight of the rubber shavings. The binder itself has a closed cellular structure and fills up all the space between the rubber shavings. The density of the material is about 600 kp/m$^3$. The height of the boards is 60 cm and they span across 2 m.

Figure 5:
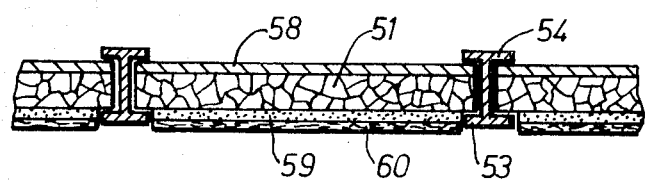

In the embodiment shown in FIG. 5, the sound-insulating wall consists of boards 51 which are sealed with a layer of asbestos cement 58 glued to the back. The ends of the boards 51 extend between the flanges 53 of the vertical double T-sections 54 which are anchored to the ground in the same way as in the example shown in FIGS. 1 to 4. The boards 51 contain rubber shavings which predominantly have a particle size of between 1 and 20 cm$^3$. The binder comprises a polyurethane which has been obtained by cross-linking an isocyanate with alcohol and it only partly fills the spaces between the rubber shavings.

The proportion of binder based on the dry unit weight of the rubber shavings is about 7 percent. In addition, the boards 51 contain an aggregate of shavings of soft foam waste the individual particles of which have a volume of 5 cm$^3$ or less.

A layer of soft foam 59 which has an open cellular structure is glued to the side of the sound-insulating wall facing the source of sound emission. In addition, a fiber fleece 60 is glued by point-glueing to this soft foam layer 59 to protect it against mechanical damage. Both the soft foam mat 59 and the fiber fleece 60 serve as sound-absorbing layers. According to another embodiment, a stone and glass wool mat is used instead of a soft foam layer. The covering layer of asbestos cement 58 has a thickenss of 2 cm. The board 51 has a thickness of 10 cm. The soft foam layer 59 has a thickness of 3 cm while the fiber fleece 60 has a thickness of about 1.5 cm.

Figure 6:
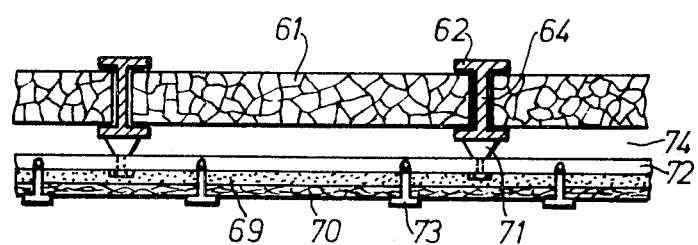
FIG. 6 — a top plan view of a third embodiment.

In FIG. 6, the insulating sound wall comprises boards 61 which are built up in the same way as in the example shown in FIG. 1. The ends of the boards engage between the flanges of double T-sections 64 which are anchored to the ground by means of concrete blocks. Distance pieces 71 are fixed to the front of the double T-sections 64 and tube sections 72 extending in the longitudinal direction are screwed to these distance pieces 71. These tube sections 72 carry the sound-absorption layer which is composed of a layer of foam 69 and a layer of fiber fleece 70. This sound-absorption layer is secured to the tube sections 72 by fish plates 73. The boards 61 are built up in the same way as in the example shown in FIGS. 1 to 4. They are also 10 cm in thickness. The foam mat 69 is 4 cm in thickness and the fiber fleece 70 has a thickness of 1 cm. The distance between the boards 61 and foam mat 69 is 8 cm. The resulting cavity 74 has the particular function of destroying low-frequency sound waves.

EXAMPLE 1

A prepolymer binder is prepared by heating at 80°C for 6 hours the following mixture: a 2000 molecular weight polypropylene ether glycol having an hydroxyl number of 50–100 parts by weight, 80/20 isomer ratio of 2,4 and 2,6-tolylene diisocyanate, 35 parts by weight, 100 pounds of scrap rubber material having an average particle size of about 10 cm$^3$ obtained by grinding old auto tires are placed in a container equipped with an agitator. 10 pounds of the prepolymer are added to the rubber while mixing takes place. The mixture is then placed in a mold and compressed to the direct density. While under compression the mixture is then exposed to superheated steam for a period of about 4 minutes. A material suitable for use in the invention is thus obtained.

What is claimed is:

1. Sound insulating wall consisting of boards 5 to 20 cm in thickness attached to a stable frame, said boards comprising a mixture of (1) rubber shavings having particle sizes of about 1 to 20 cm$^3$, (2) a binder of polyurethane foam which hardens to form a predominately closed cellular structure wherein said binder is present in an amount of between 5 and 15 percent based on the dry weight of the rubber shavings and (3) opencelled soft foam waste which is present in the spaces between the rubber shavings.

2. A sound insulating wall according to claim 1 wherein the space between the rubber shavings is only partly filled with binder.

3. Sound insulating wall consisting of boards 5 to 20 cm in thickness attached to a stable frame, said boards comprising a mixture of (1) rubber shavings having particle sizes of about 1 to 20 cm$^3$, (2) a binder of polyurethane foam which hardens to form a predominately closed cellular structure wherein said binder is present in an amount of between 5 and 15 percent based on the dry weight of the rubber shavings and (3) wherein the side of the board facing the sound emission is covered with a sound-absorption layer 1 to 8 cm in thickness comprising a material selected from the group consisting of soft foam, stone wool, glass wool, fiber fleece and combinations of these materials.

4. A sound insulating wall according to claim 3 wherein the sound-absorption layer is placed in front of the boards so as to have a space between the board and the soundabsorption layer.

5. Sound insulating wall consisting of boards 5 to 20 cm in thickness attached to a stable frame, said boards comprising a mixture of (1) rubber shavings having particle sizes of about 1 to 20 cm$^3$, (2) a binder of polyurethane foam which hardens to form a predominately closed cellular structure wherein said binder is present in an amount of between 5 and 15 percent based on the dry weight of the rubber shavings and (3) wherein the side of the boards facing away from the source of sound emission is covered with a fiber fleece.

* * * * *